United States Patent [19]

Cherry et al.

[11] Patent Number: 4,779,316

[45] Date of Patent: Oct. 25, 1988

[54] CRANKSHAFT AND A PROCESS FOR BALANCING THE SAME

[75] Inventors: Jack D. Cherry, Grundy Center; David V. Trumbauer, Denver; Steven L. Hastings, Waterloo, all of Iowa

[73] Assignee: Deere & Company, Moline, Ill.

[21] Appl. No.: 47,838

[22] Filed: May 6, 1987

[51] Int. Cl.[4] ............................................. B21K 1/08
[52] U.S. Cl. ..................................... 29/6; 29/402.09; 29/402.17; 74/603
[58] Field of Search ............... 74/603; 29/6, 402.09, 29/402.11, 402.17

[56] References Cited

U.S. PATENT DOCUMENTS

| | | | |
|---|---|---|---|
| 2,494,569 | 1/1950 | McMaster | 29/6 X |
| 3,537,333 | 11/1970 | Seifert et al. | 29/6 X |
| 3,704,636 | 12/1972 | Piech | 29/6 X |
| 3,772,763 | 11/1973 | Henson et al. | 29/6 |

Primary Examiner—Timothy V. Eley

[57] ABSTRACT

A crankshaft and counterweights are balanced by adding additional weight without modifying their outer dimensions. Bores are drilled into the counterweights and then a slug of material which is of a different density than the original counterweight material is inserted into the drilled bore. The slug may be held in place by any suitable mechanism, e.g., press-fitting, upset fitting, welding or threading. Particularly with threading, a slug shorter than the bore may be positioned anywhere within the bore.

20 Claims, 1 Drawing Sheet

CRANKSHAFT AND A PROCESS FOR BALANCING THE SAME

BACKGROUND OF THE INVENTION

1. Field of the Invention

The present invention relates to methods for balancing a crankshaft of an engine, and the resultant crankshaft.

2. Description of the Related Art

The typical crankshaft of an internal combustion engine has multiple offset portions which are driven by the piston rods of the engine. To minimize damaging vibration, the crankshaft normally is provided with counterweights which counterbalance the offset portions of the crankshaft.

It is not economically feasible to manufacture the crankshaft and counterweights so that they are totally balanced from the start. Instead, the crankshaft and counterweights normally are manufactured so that they are approximately balanced and then "fine tuned" to bring them into an optimum final static and dynamic balance. This usually is accomplished by selectively removing parts of the counterweights, e.g., by drilling holes in them. U.S. Pat. No. 2,997,882 (Harvey) teaches a machine for such balancing.

It has been known for some time that counterweights or other vibration dampers for engines could at least theoretically be balanced by adding weight to them, much as as slug is added to balance a vehicle wheel. See Harvey and U.S. Pat. No. 3,222,953 (Benjamen). However, as Harvey notes, it is easier to drill out excess material to obtain a precise final balance than to add material. Thus, even where additional material is added, final balancing has still generally been done by drilling. See U.S. Pat. No. 3,748,925 (Stewart). Only recently has it been suggested that it may sometimes be desirable to balance the crankshaft solely by adding weight to the outside of the crankshaft. See U.S. Pat. No. 4,445,399 (Sasaki et al.).

Whenever it has been suggested to add weight, the additional material has been added to the outside of the counterweight or balance member. In modern engines, the clearance tolerances around the crankshaft are quite tight. Thus, there simply is no room to add additional material to the outside of the crankshaft, counterweights or other balancing members.

SUMMARY OF THE INVENTION

Accordingly, it is an object of the present invention to provide a crankshaft and a process for balancing the crankshaft and its counterweights by adding weight at selected locations thereof without altering the dimensions of the crankshaft, counterweights, or other balancing members.

This object is accomplished according to the present invention by removing a portion of a counterweight or other balancing member and then substituting for at least part of the removed portion a slug of a material having a different density than the removed material.

In a preferred embodiment, bores are drilled into each counterweight and then slugs of a material denser than the material of the counterweight are inserted into the bores. These slugs may entirely fill the bores, or may fill only portions thereof. The slugs may be press-fitted into the bores, or, if the bores are appropriately shaped, upset fitted in the bores. Some bores may also have no slugs provided in them, i.e., may be left empty.

In a further preferred embodiment, the bore is tapped after drilling to provide it with internal threads. A threaded slug shorter than the bore then can be screwed into the bore and the radial position thereof adjusted by turning the slug with a screwdriver.

Alternatively, it also would be possible to insert a slug having a lower density than the original counterweight material, thereby providing yet another refinement for balancing the crankshaft.

BRIEF DESCRIPTION OF THE DRAWINGS

The invention will be described below in further detail with reference to the following figures, in which like reference numerals refer to like elements.

DETAILED DESCRIPTION OF THE PREFERRED EMBODIMENTS

Figure 1:
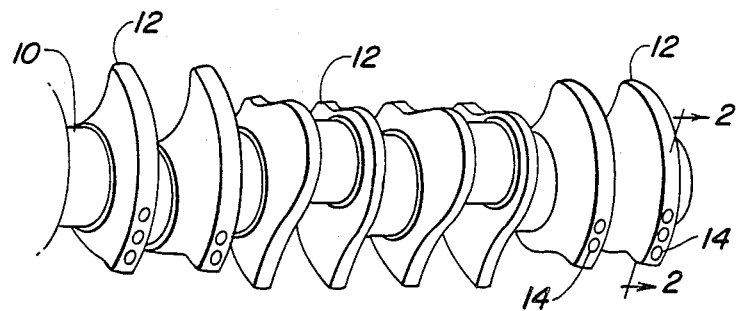
FIG. 1 depicts a crankshaft and counterweights having a plurality of bores therein.

FIG. 1 generally depicts a crankshaft 10 having a plurality of counterweights 12 thereon. Bores 14 have been formed in each counterweight as needed to balance the counterweight.

Figure 2:
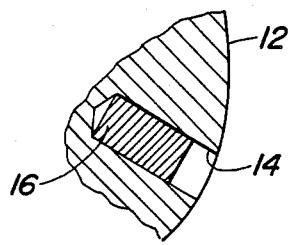
FIGS. 2 through 5 are cross-sectional views along the line 2—2 in FIG. 1. of various embodiments of slugs inserted into bores according the the present invention.

Referring to FIG. 2, a slug 16 of a density different from the counterweights 12 is shown inserted into the bore 14, e.g., by press fitting. The slug 16 can be either more or less dense than the original material of the counterweights 12. If the counterweights 12 are made out of the conventional nodular iron, suitable denser materials would include tungsten, gold, platinum, lead and various lead alloys, e.g., lead alloyed with bismuth, tin or nickel. Aluminum and various aluminum alloys would be suitable for use as materials less dense than nodular iron. While these materials are suggested as examples, they are in no way intended to be all inclusive and any suitable material having a different density from the counterweights could be used.

Figure 3:
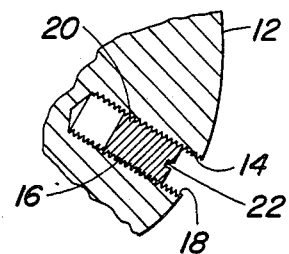

In an alternative embodiment shown in FIG. 3, after the bore 14 has been drilled, it is tapped to provide threads 18 on the inner surface thereof. Slug 16 then preferably also is threaded on its outer surface with threads 20 corresponding to threads 18, and preferably is provided with a screwdriver slot 22. If, as illustrated, slug 16 is shorter than bore 14, the position of slug 16 along bore 14 then can be adjusted by screwing the slug 16 into or out of the bore 14.

Figure 4:
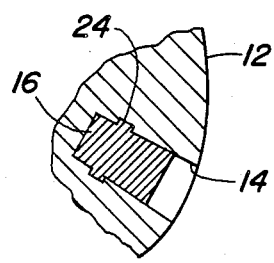
Figure 5:
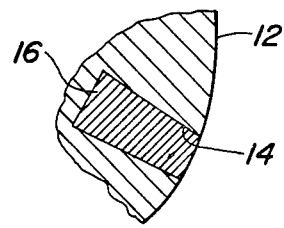

In further embodiments, the bore 14 may be provided with a radially extenting slot 24 near its innermost end, as shown in FIG. 4, or simply may be radially larger at its innermost than its outermost end, as shown in FIG. 5. In either situation, the slug can be held in place by upset fitting the slug 16 into the bore 14, that is, by pressing the slug 16 into the bore 14 with sufficient force that it deforms to fill the innermost portion of the bore 14. This technique also could be used with the threaded bore illustrated in FIG. 3.

The slugs can be shorter than the bore, as illustrated in FIGS. 2, 3 and 4, or can extend to the original outer surface of the counterweight, as illustrated in FIG. 5.

The actual balancing can be conducted in the usual fashion, e.g., by hand or as taught by the references cited above, the only additional factor being to take into consideration the added mass of the slug when determining the balance points.

While the invention has been described with reference to particular embodiments, it is not intended to be limited thereby as various alternative within the scope of the appended claims would readily be apparent to one of ordinary skill in the art. For example, the bores and slugs can be provided in balancing members other than the counterweights, e.g., vibration damping members. The slugs also might be fitted into the bores and welded into place. In addition, the counterweights could be trimmed rather than bored, then built up with new material within the original bounds of the counterweights. Accordingly, the scope of the invention is intended to be limited only by the following claims.

We claim:

1. A process for balancing a crankshaft having balancing members of a first material, comprising:
   selectively removing a portion of at least one balance member by drilling at least one bore in said balance member;
   threading said at least one boe; and
   replacing at least part of said removed portion with a second material having a density different from the first material and positioning such second material at a location within the region previously occupied by said removed portion so as to optimize the balance of the crankshaft, said second material being held in said at least one bore by the threads formed therein.

2. The process of claim 1, further comprising the step of threading said second material, such that said second material is threadedly engageable with the threads in said at least one bore.

3. The process of claim 2, wherein a position of said second material in said at least one bore is adjustable by adjusting an engagement position of said threads.

4. The process of claim 1, wherein said second material is denser than said first material.

5. The process of claim 4, wherein said first material is nodular iron and said second material is selected from the group consisting of lead, the lead alloys, tungsten, gold and platinum.

6. The process of claim 1, wherein said first material is denser than said second material.

7. The process of claim 6, wherein said first material is nodular iron and said second material is selected from the group consisting of aluminum and the aluminum alloys.

8. A process for balancing a crankshaft having counterweights of a first material, comprising:
   drilling at least one bore in at least one counterweight;
   tapping said bore to internally thread said bore; and
   inserting into said bore a slug of a second material having a density different from said first material and positioning said slug at a location within said bore selected to optimize the balance of the crankshaft.

9. The process of claim 12, further comprising the step of externally threading said slug before inserting it into said bore, the threads on said slug being engageable with the threads in said bore.

10. The process of claim 9, wherein said slug is shorter than said bore, a position of said slug in said bore being adjustable by rotation of said slug to alter an engagement position of said threads.

11. The process of claim 8, wherein said second material is denser than said first material.

12. The process of claim 11, wherein said first material is nodular iron and said second material is selected from the group consisting of lead, the lead alloys, tungsten, gold and platinum.

13. The process of claim 8, wherein said first material is denser than said second material;

14. The process of claim 3, wherein said first material is nodular iron and said second material is selected from the group consisting of aluminum and the aluminum alloys.

15. A balanced crankshaft having at least one balance member, produced by the process comprising:
   providing a crankshaft having at least one balance member of a first material;
   selectively removing a portion of at least one balance member by drilling at least one bore in said at least one balancing member; and
   replacing at least part of said removed portion with a slug formed of a second material having a density different from said first material, each said bore and slug being threadedly engageable such that a position of said slug in said bore is adjustable by adjusting the thread engagement position, and positioning said slug at a location within the bore selected to optimize the balance of the crankshaft.

16. The crankshaft of claim 18, wherein said first material is nodular iron and said second material is selected from the group consisting of lead, the lead alloys, tungsten, gold, platinum, aluminum and the aluminum alloys.

17. The crankshaft of claim 18, wherein each said at least one balance member comprises a counterweight.

18. A balanced crankshaft having at least one balance member, comprising:
   a crankshaft having at least one offset portion;
   at least one balance member of a first material connected to said crankshaft to balance the same;
   at least one bore formed in said balance member; and
   a slug in said at least one bore and formed of a second material having a density different from said first material, said at least one bore and said slug being threadedly engageable such that a position of said slug in said at least one bore is adjustable by adjusting the thread engagement position, a mass and position of said slug and a position of said at least one bore in said balance member being selected so as to statically and dynamically balance said crankshaft and said at least one balance member.

19. The crankshaft of claim 18, wherein said first material is nodular iron and said second material is selected from the group consisting of lead, the lead alloys, tungsten, gold, platinum, aluminum and the aluminum alloys.

20. The crankshaft of claim 18, wherein each said at least one balance member comprises a counterweight.

* * * * *

UNITED STATES PATENT AND TRADEMARK OFFICE
CERTIFICATE OF CORRECTION

PATENT NO. : 4,779,316

DATED : 25 Oct. 1988

INVENTOR(S) : Jack Douglas Cherry et al.

It is certified that error appears in the above-identified patent and that said Letters Patent is hereby corrected as shown below:

```
Col. 3, line 22, change "boe" to -- bore --; and
        line 60, change "12" to -- 8 --.
Col. 4, line 14, change ";" to -- . --;
        line 15, change "3" to -- 13 --;
        line 34, change "18" to -- 15 --; and
        line 39, change "18" to -- 15 --.
```

Signed and Sealed this

Eighth Day of August, 1989

Attest:

DONALD J. QUIGG

*Attesting Officer*

*Commissioner of Patents and Trademarks*